United States Patent
Hagiwara

(10) Patent No.: US 9,613,437 B2
(45) Date of Patent: Apr. 4, 2017

(54) IMAGE PRODUCING APPARATUS, RADIATION TOMOGRAPHY APPARATUS, AND PROGRAM

(71) Applicant: General Electric Company, Schenectady, NY (US)

(72) Inventor: Akira Hagiwara, Tokyo (JP)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/726,039

(22) Filed: May 29, 2015

(65) Prior Publication Data

US 2015/0348288 A1    Dec. 3, 2015

(30) Foreign Application Priority Data

May 30, 2014    (JP) .................................. 2014-112389

(51) Int. Cl.
| | |
|---|---|
| G06K 9/00 | (2006.01) |
| G06T 11/00 | (2006.01) |
| G06T 5/00 | (2006.01) |
| G06T 5/50 | (2006.01) |

(52) U.S. Cl.
CPC ............ *G06T 11/003* (2013.01); *G06T 5/002* (2013.01); *G06T 5/50* (2013.01); *G06T 2207/10081* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 6,754,398 B1* | 6/2004 | Yamada | ............... | H04N 19/635 358/3.26 |
| 7,639,772 B2* | 12/2009 | Nishide | ................. | G06T 11/005 378/4 |
| 8,989,470 B2* | 3/2015 | Hagiwara | .............. | A61B 6/032 382/131 |
| 2011/0242370 A1* | 10/2011 | Endo | ...................... | H04N 5/225 348/241 |
| 2014/0363070 A1* | 12/2014 | Kobayashi | ............ | G06T 7/0012 382/132 |

FOREIGN PATENT DOCUMENTS

JP          201245121 A      3/2012

* cited by examiner

*Primary Examiner* — Nancy Bitar
(74) *Attorney, Agent, or Firm* — Fletcher Yoder, P.C.

(57) ABSTRACT

An image producing apparatus comprising a reconstructing unit configured to use a first reconstruction filter to reconstruct an image based on projection data collected by a scan on a subject to be imaged using a radiation source and a detector; a difference-calculating unit configured to calculate a difference between two images based on said projection data, said two images being reconstructed using second and third reconstruction filters respectively having spatial frequency characteristics such that degrees of enhancement in a mid-/low-frequency region are substantially identical to each other and degrees of enhancement in a high-frequency region are different from each other; and an image production unit configured to produce an image having reduced aliasing artifacts using said image reconstructed using said first reconstruction filter, and said difference.

17 Claims, 8 Drawing Sheets

FIG.8
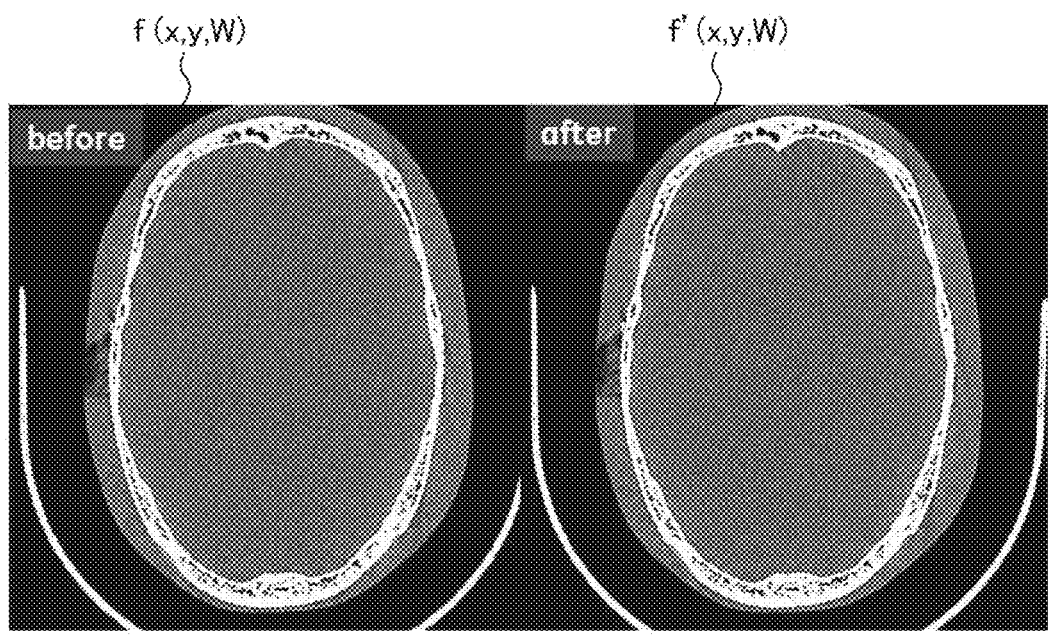
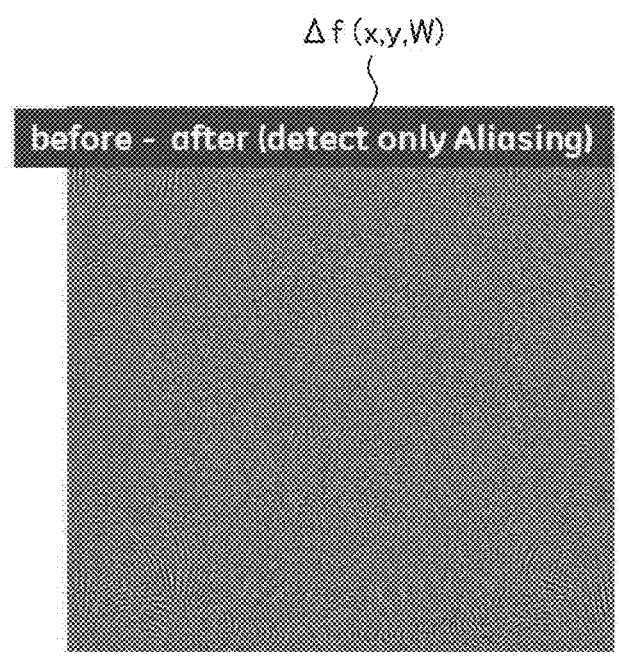

FIG.9
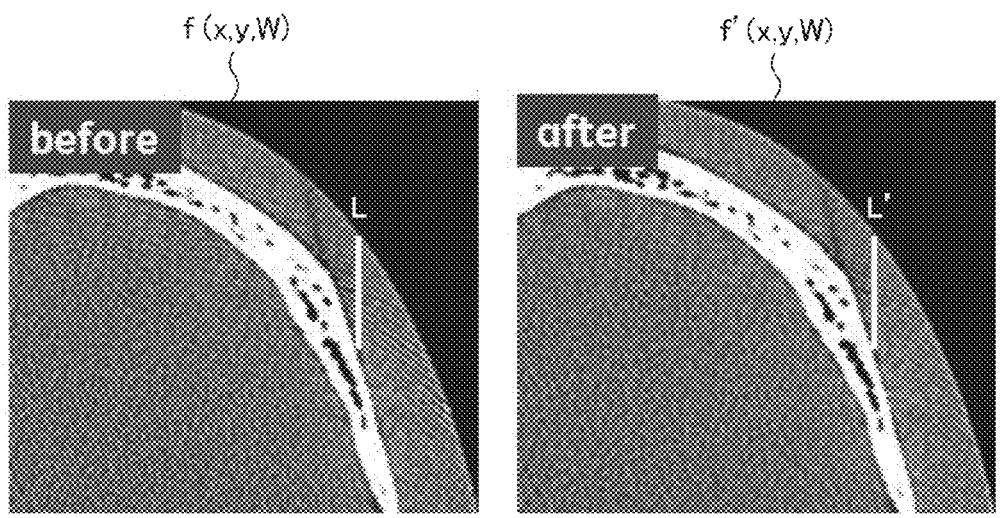
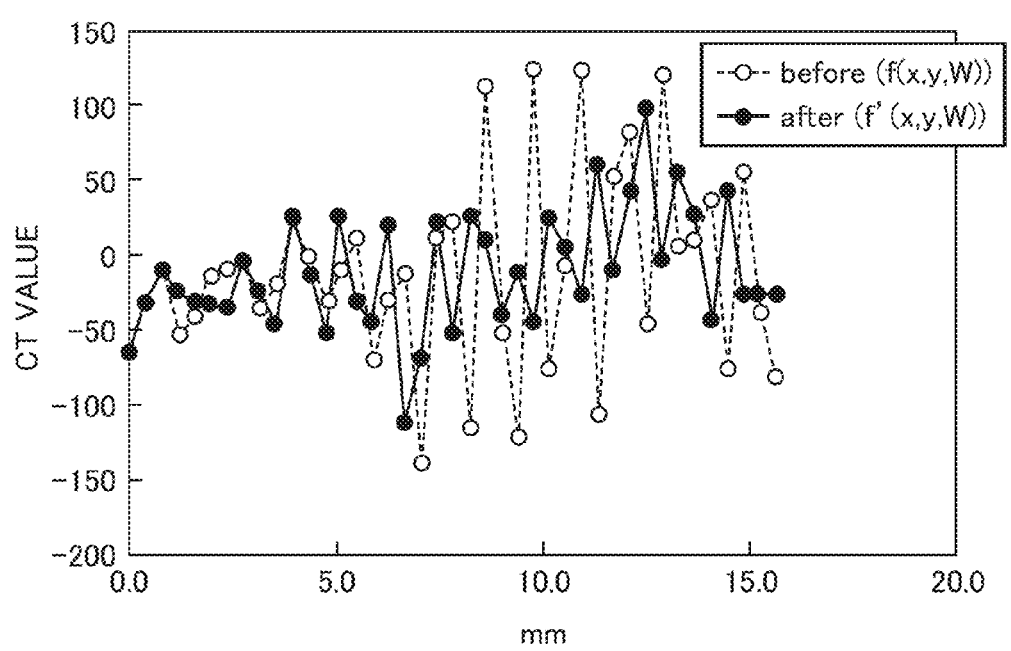

IMAGE PRODUCING APPARATUS, RADIATION TOMOGRAPHY APPARATUS, AND PROGRAM

BACKGROUND

Embodiments of the invention relate to a technique for reducing artifacts appearing in an image produced by a radiation tomography apparatus.

Aliasing artifacts are known as one kind of artifact appearing in images produced by radiation tomography apparatuses. The aliasing artifacts are affected by the spatial resolution of a radiation detector, focus size of a radiation source, number of data samples, and the like, in a radiation tomography apparatus, and they are generated mainly in case that a subtle difference occurs in reproduction of the shape of edges or a minute shape in an object, which is a target to be imaged. More particularly, this may be explained as follows:

Let us consider a radiation detector having detector elements arranged with fine pitch and providing very good spatial resolution. In this case, the shape of an object obtained at the radiation detector is consistent with little discrepancy when imaged in any view direction. On the other hand, consider a radiation detector having detector elements arranged with coarse pitch and providing poor spatial resolution. In this case, the shape of an object obtained at the radiation detector has a varying degree of inconsistency depending upon the positional relationship between the object and radiation detector. Specifically, the shape of an object may inconsistently look somewhat broad in a certain view direction or sharp in another view direction, resulting in a difference from view direction to view direction. Such a difference may often occur in case that a high-contrast border of an object significantly changes due to a small difference in view angle. The inconsistent information therefrom causes streak artifacts on the borderline of the object. This is the origin of aliasing artifacts. The artifacts thus resulting from inconsistent information is usually variable, and therefore, it is difficult to cancel out the artifacts by a filtered back-projection technique.

The phenomenon of generation of aliasing artifacts is a fundamental one based on a mutual relationship between a structure related to the spatial resolution of a radiation detector and conditions in sampling by the detector, and the like, which cannot be avoided.

Conventional measures against the phenomenon include, for example, a methods involving adjusting spatial frequency characteristics of a reconstruction filter (also referred to as reconstruction function) for use in image reconstruction processing to make the aliasing artifacts inconspicuous.

SUMMARY OF THE INVENTION

The method of adjusting spatial frequency characteristics of a reconstruction filter, however, requires a compromise of the spatial resolution in suppressing aliasing artifacts in which high-frequency components are dominant. On the contrary, aliasing artifacts inevitably increase in case that the spatial frequency of an actual image is extended towards a higher side.

In the method involving detecting artifacts from a feature of an image and reducing them, it is difficult to improve the accuracy of detection because aliasing artifacts inconsistently appear. Further, the cost of the calculation for detecting aliasing artifacts is relatively high.

In view of such circumstances, it is desirable to provide a technique with which aliasing artifacts appearing in an image produced by a radiation tomography apparatus may be reduced with high accuracy.

The invention in its first aspect provides an image producing apparatus comprising:

a reconstructing portion configured for using a first reconstruction filter to reconstruct an image based on projection data collected by a scan on a subject to be imaged using a radiation source and a detector;

a difference-calculating portion configured for calculating a difference between two images based on said projection data, said two images being reconstructed using second and third reconstruction filters respectively having spatial frequency characteristics such that degrees of enhancement in a mid-/low-frequency region are substantially identical to each other and degrees of enhancement in a high-frequency region are different from each other; and a producing portion configured for producing an image having reduced aliasing artifacts using said image reconstructed using said first reconstruction filter, and said difference.

The invention in its second aspect provides the image producing apparatus in the first aspect, wherein:

said producing portion produces said image having reduced aliasing artifacts by subtracting an image component generated by multiplying said difference by a specified factor, from said image reconstructed using said first reconstruction filter.

The invention in its third aspect provides an image producing apparatus, comprising:

a filtering portion configured for using a first reconstruction filter to determine filtered projection data based on projection data collected by a scan on a subject to be imaged using a radiation source and a detector;

a difference-calculating portion configured for determining a difference between two sets of filtered projection data based on said collected projection data, said two sets of filtered projection data being generated using second and third reconstruction filters respectively having spatial frequency characteristics such that degrees of enhancement in a mid-/low-frequency region are substantially identical to each other and degrees of enhancement in a high-frequency region are different from each other; and a producing portion configured for producing an image having reduced aliasing artifact components using said filtered projection data obtained using said first reconstruction filter, and said difference.

The invention in its fourth aspect provides the image producing apparatus in the third aspect, wherein:

said producing portion produces said image having reduced aliasing artifacts by applying back-projection processing to projection data obtained by subtracting a projection data component generated by multiplying said difference by a specified factor, from said filtered projection data obtained using said first reconstruction filter.

The invention in its fifth aspect provides the image producing apparatus in any one of the first through fourth aspects, wherein:

rates of change of the degrees of enhancement in a high-frequency region in said second and third reconstruction filters relative to the degree of enhancement in a high-frequency region in said first reconstruction filter fall within 5%.

The invention in its sixth aspect provides the image producing apparatus in any one of the first through fifth aspects, wherein:

the degrees of enhancement in a mid-/low-frequency region in said first, second and third reconstruction filters are substantially identical to one another.

The invention in its seventh aspect provides the image producing apparatus in any one of the first through sixth aspects, wherein:

said high-frequency region includes a frequency region in the vicinity of a Nyquist frequency.

The invention in its eighth aspect provides the image producing apparatus in any one of the first through seventh aspects, wherein:

the degree of enhancement in a high-frequency region in one of said second and third reconstruction filters is higher than that in said first reconstruction filter, and the degree of enhancement in a high frequency region in the other of said second and third reconstruction filters is lower than that in said first reconstruction filter.

The invention in its ninth aspect provides the image producing apparatus in any one of the first through eighth aspects, wherein:

said difference-calculating portion calculates said difference for each frequency region of aliasing artifacts using second and third reconstruction filters defined for said frequency region, and said producing portion performs said subtraction for each said frequency region of aliasing artifacts using said factor defined for said frequency region and said difference determined for said frequency region.

The invention in its tenth aspect provides the image producing apparatus in any one of the first through seventh aspects, wherein:

one of said second and third reconstruction filters is substantially identical to said first reconstruction filter.

The invention in its eleventh aspect provides the image producing apparatus in any one of the first through tenth aspects, wherein:

said producing portion produces a new image by performing weighted addition on said image having reduced aliasing artifacts and said image reconstructed using said first reconstruction filter for each image region using a weight according to a magnitude and/or degree of variability of pixel values in said image region.

The invention in its twelfth aspect provides a radiation tomography apparatus comprising the image producing apparatus in any one of the first through eleventh aspects.

The invention in its thirteenth aspect provides a program for causing a computer to function as the image producing apparatus in any one of the first through eleventh aspects.

According to the invention in the aforementioned aspects, a phenomenon that the intensity of aliasing artifacts appearing in a reconstructed image varies depending upon a reconstruction filter used in image reconstruction is used to determine a difference between two images respectively reconstructed with two mutually different kinds of reconstruction filter, whereby information on aliasing artifacts is directly extracted and the information is used in reducing aliasing artifacts; therefore, aliasing artifacts can be reduced with high accuracy. Moreover, the extraction of aliasing artifact information is achieved without using image analysis, which reduces the cost of the calculation.

BRIEF DESCRIPTION OF THE DRAWINGS

FIG. 8 is a representation showing a result of comparison between an "ordinary image" produced by a common technique and a "corrected image" produced by the technique proposed herein; and FIG. 9 is a representation showing partial enlargements of the "ordinary image" by the common technique and the "corrected image" by the technique proposed herein, and a profile of their aliasing portions.

DETAILED DESCRIPTION

Now several embodiments of the invention will be described.

First, a configuration of an X-ray CT apparatus in accordance with the present embodiment will be described.

Figure 1:
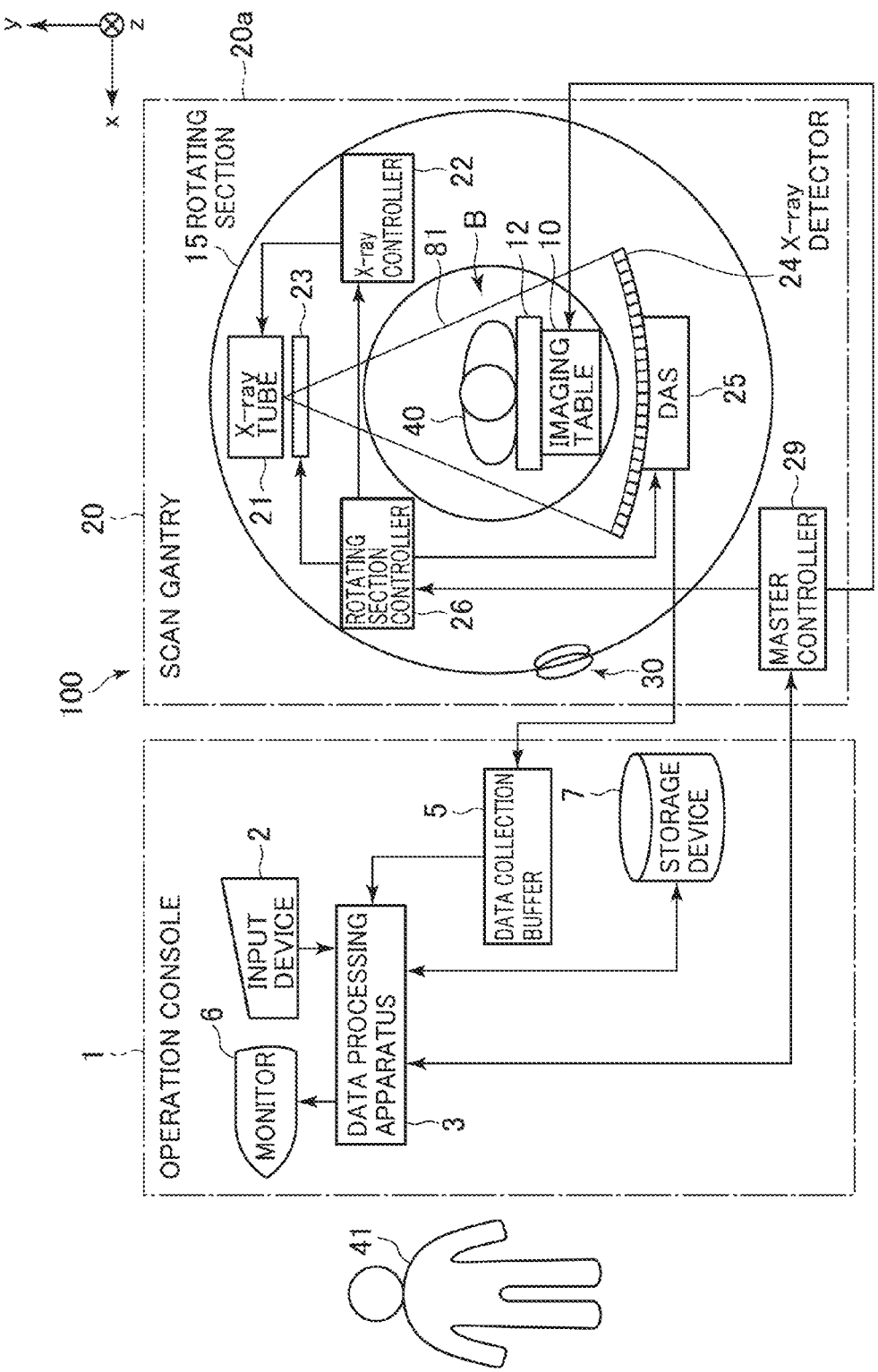
FIG. 1 is a diagram schematically showing a configuration of an X-ray CT apparatus in accordance with an embodiment of the present invention.

FIG. 1 is a diagram schematically showing a configuration of an X-ray CT apparatus in accordance with the present embodiment.

As shown in FIG. 1, the X-ray CT apparatus 100 comprises an operation console 1, an imaging table 10, and a scan gantry 20.

The operation console 1 comprises an input device 2 for accepting an input from an operator 41, a data processing apparatus 3 for controlling several sections for imaging of a subject (object to be imaged) 40 and applying data processing for producing an image, etc., a data collection buffer 5 for collecting data acquired in the scan gantry 20, a monitor 6 for displaying an image, and a storage device 7 for storing therein programs, data, and the like.

The imaging table 10 comprises a cradle 12 for laying thereon the subject 40 to carry the subject 40 into a bore B in the scan gantry 20. The cradle 12 is vertically and horizontally translated by a motor incorporated in the imaging table 10. As used herein, a body-axis direction of the subject 40, i.e., a direction of horizontal translation of the cradle 12, will be referred to as z-axis direction, a vertical direction as y-axis direction, and a horizontal direction perpendicular to the z- and y-axis directions as x-axis direction.

The scan gantry 20 comprises a rotatably supported rotating section 15. The rotating section 15 is provided with an X-ray tube 21, an X-ray controller 22 for controlling the X-ray tube 21, an aperture 23 for shaping X-rays 81 generated from the X-ray tube 21 into a fan beam or a cone beam, an X-ray detector 24 for detecting the X-rays 81 passing through the subject 40, a DAS 25 for collecting output signals from the X-ray detector 24 as data, and a rotating section controller 26 for controlling the X-ray controller 22 and aperture 23. The body of the scan gantry 20 comprises a master controller 29 for communicating control signals and the like with the operation console 1 and imaging table 10. The rotating section 15 and the body of the scan gantry 20 are electrically connected to each other via a slip ring 30.

The X-ray tube 21 and X-ray detector 24 are placed facing each other on either side of an imaging volume in which the subject 40 is placed, i.e., the bore B of the scan gantry 20. A rotation of the rotating section 15 causes the X-ray tube 21 and X-ray detector 24 to rotate around the subject 40 while keeping their positional relationship. The X-rays 81 in the form of a fan or cone beam emitted from the X-ray tube 21 and shaped through the aperture 23 pass through the subject 40 and impinge upon a detecting surface of the X-ray detector 24.

As used herein, a direction of width of the fan- or cone-beam X-rays 81 in the xy plane will be referred to as channel (CH) direction, a direction of width in the z-axis direction or the z-axis direction itself as slice (SL) direction, and a direction toward a center of rotation of the rotating section 15 in the xy plane as iso-center (I) direction.

The X-ray detector 24 is comprised of a plurality of detector elements 24$i$ disposed in the channel and slice directions. The number of the detector elements 24$i$ in the channel direction is of the order of 1000, for example, over a 60-degree angular range, and they are arranged at a pitch of the order of 1 mm, for example.

Next, a functional configuration of a portion related to image production processing in the X-ray CT (Computed Tomography) apparatus in accordance with the present embodiment will be described.

Figure 2:
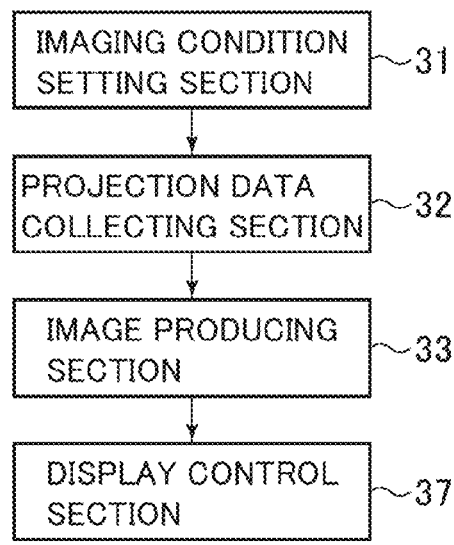
FIG. 2 is a block diagram showing a functional configuration of a portion related to production of an image in the X-ray CT apparatus in the present embodiment.

FIG. 2 is a block diagram showing a functional configuration of a portion related to production of an image in the X-ray CT apparatus in the present embodiment. As shown in FIG. 2, the X-ray CT apparatus 100 has an imaging condition setting section 31, a projection data collecting section 32, an image producing section 33, and a display control section 37. It should be noted that these sections are functionally implemented by the data processing apparatus 3 loading programs stored in the storage device 7 and executing them. Now functions of these sections will be described in more detail.

The imaging condition setting section 31 sets imaging conditions in response to an operation by the operator 41. The imaging conditions include, for example, the X-ray tube voltage, X-ray tube current, coverage in the z-axis direction (body-axis direction of the subject 40), slice thickness, helical pitch, target image noise level in using an auto exposure mechanism, and kind of reconstruction filter (reconstruction function) used in image reconstruction. A plurality of kinds of reconstruction filter are provided according to a region to be imaged or a purpose/use, such as a filter having a spatial frequency characteristic enhancing a high-frequency region or one suppressing a high-frequency region.

The projection data collecting section 32 controls the imaging table 10 and scan gantry 20 to perform a scan on the subject 40 based on the set imaging conditions. By performing the scan, projection data for the subject 40 in a plurality of views are collected.

The image producing section 33 produces an image based on the collected projection data. The image producing section 33 will be particularly discussed later.

The display control section 37 controls the monitor 6 to display the produced image and information such as characters on its screen.

Now the image producing section 33 will be particularly described. The image producing section 33 produces an image based on the projection data in a plurality of views collected by scanning the subject 40 using a reconstruction filter set in the imaging conditions. It is an object here to easily and accurately detect aliasing artifacts to reduce only the artifacts without compromising spatial resolution of an image.

Now a concept and technique of detection and reduction of aliasing artifacts in the present embodiment will be described.

Generally, when considering a spatial frequency region equal to or lower than the Nyquist frequency, aliasing artifacts mainly has more dominant information in a high-frequency region than in a mid-/low-frequency region. The Nyquist frequency is a frequency defined based on an inverse of a pitch at which the detector elements are arranged in the X-ray detector 24, and represents a limit of the fundamentally reproducible spatial frequency.

Accordingly, in case that the degree of enhancement in a high-frequency region as one of the spatial frequency characteristics of a reconstruction filter used in image reconstruction is different, the intensity of aliasing artifacts appearing in a reconstructed image is different as well. Therefore, by providing two kinds of reconstruction filter having slightly different degrees of enhancement in such a high-frequency region, and determining a difference between two images obtained by the respective reconstruction filters, information on aliasing artifact components may be obtained from the difference. Then, the information may be used to reduce aliasing artifacts appearing in the reconstructed image.

Calculation formulae for a common filtered back-projection technique are given as follows:

$$f(x, y, W) = \frac{1}{4\pi} \int_0^{2\pi} q(x\cos\theta + y\sin\theta, \theta, W) d\theta \qquad (1)$$
$$= \frac{1}{4\pi} \int_0^{2\pi} q(X, \theta, W) d\theta$$

$$q(X, \theta, W) = \frac{1}{2\pi} \int \int_{-\infty}^{\infty} g(X, \theta)e^{-i\omega X} dX g(W) e^{i\omega X} d\omega \qquad (2)$$

$$g(W) = h(W) \times |\omega| \qquad (3)$$

In these equations, (x, y) represents rectangular coordinates in a horizontal direction x and a vertical direction y in an image space corresponding to an actual space, $\theta$ represents an angle in the xy plane around an origin O of the xy rectangular coordinates, and w represents a spatial frequency.

EQ. (3) expresses a reconstruction filter g(W) adjusted by multiplying a basic filter $|\omega|$ by a factor h(W). W denotes a parameter for identifying an individual filter.

Representing a coordinate on the x-axis after rotating the xy rectangular coordinates by an angle $\theta$ as X, EQ. (2) represents an operation of multiplying one-dimensional Fourier transform on projection data g(X, $\theta$) in a direction of angle $\theta$ with respect to X by a reconstruction filter represented by g(W) in a domain of a spatial frequency $\omega$, and applying inverse Fourier transform to determine filtered projection data q(X, $\theta$, W). This may be also considered as an operation of convoluting the projection data with a reconstruction filter function to obtain convoluted data. It should be noted that X is defined as a relation given by X=x·cos $\theta$+y·sin $\theta$. The portion of EQ. (2) corresponds to filtering.

EQ. (1) represents an operation of back-projecting the filtered projection data q(X, θ, W) over 360 degrees of angle θ to obtain an image f(x, y, W).

That is, EQS. (1)-(3) represent an operation of applying filtering to projection data g(X, θ) with a reconstruction filter g(W) to generate filtered projection data q(X, θ, W), and then back-projecting it to determine an image f(x, y, W).

Under the definition as described above, basic calculation formulae for producing a corrected image having reduced aliasing artifacts may be written as follows:

$$f'(x, y, W_1) = f(x, y, W_1) - k \times (f(x, y, W_2) - f(x, y, W_3)) \quad (4)$$

$$f(x, y, W_1) = \frac{1}{4\pi} \int_0^{2\pi} q(x\cos\theta + y\sin\theta, \theta, W_1) d\theta \quad (5)$$
$$= \frac{1}{4\pi} \int_0^{2\pi} q(X, \theta, W_1) d\theta$$

$$q(X, \theta, W_1) = \frac{1}{2\pi} \int \int_{-\infty}^{\infty} g(X, \theta) e^{-i\omega X} dX g(W_1) e^{i\omega X} d\omega \quad (6)$$

$$f(x, y, W_2) = \frac{1}{4\pi} \int_0^{2\pi} q(x\cos\theta + y\sin\theta, \theta, W_2) d\theta \quad (7)$$
$$= \frac{1}{4\pi} \int_0^{2\pi} q(X, \theta, W_2) d\theta$$

$$q(X, \theta, W_2) = \frac{1}{2\pi} \int \int_{-\infty}^{\infty} g(X, \theta) e^{-i\omega X} dX g(W_2) e^{i\omega X} d\omega \quad (8)$$

$$f(x, y, W_3) = \frac{1}{4\pi} \int_0^{2\pi} q(x\cos\theta + y\sin\theta, \theta, W_3) d\theta \quad (9)$$
$$= \frac{1}{4\pi} \int_0^{2\pi} q(X, \theta, W_3) d\theta$$

$$q(X, \theta, W_3) = \frac{1}{2\pi} \int \int_{-\infty}^{\infty} g(X, \theta) e^{-i\omega X} dX g(W_3) e^{i\omega X} d\omega \quad (10)$$

In these equations, g(W1) represents a first reconstruction filter. The first reconstruction filter g(W1) is a reconstruction filter intended for use in image reconstruction, and is set as imaging condition. Moreover, g(W2) and g(W3) are second and third reconstruction filters, respectively. The second and third reconstruction filters g(W2), g(W3) have spatial frequency characteristics such that the degrees of enhancement in the mid-/low-frequency region are substantially identical to that of the first reconstruction filter g(W1), and the degrees of enhancement in the high-frequency region are slightly different from that of the first reconstruction filter g(W1). The second reconstruction filter g(W2) and third reconstruction filter g(W3) are different from each other. The symbol k denotes a correction factor.

Figure 3:
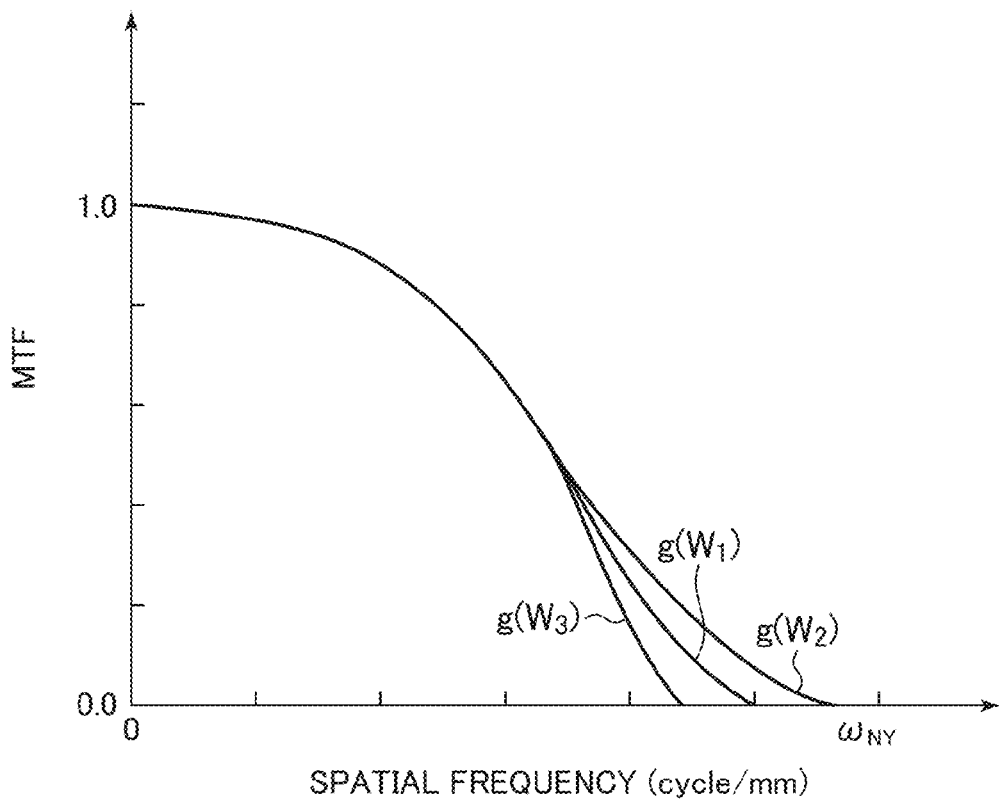
FIG. 3 is a diagram showing exemplary spatial frequency characteristics in first-third reconstruction filters.

FIG. 3 is a diagram showing exemplary spatial frequency characteristics in the first-third reconstruction filters g(W1), g(W2), g(W3). This drawing represents MTF (Modulation Transfer Function) curves as the spatial frequency characteristics. In the drawing, the high-frequency region includes a region in the vicinity of Nyquist frequency ωNY, and may be defined as region within 30% from Nyquist frequency ωNY to a low frequency side, for example, where a frequency region equal to or lower than Nyquist frequency ωNY is defined as 100%.

In the present embodiment, the first reconstruction filter g(W1) is a standard filter describing an MTF curve having the MTF value gradually decreasing on a higher side of the spatial frequency. The second reconstruction filter g(W2) is a reconstruction filter having a degree of enhancement (MTF value) in the mid-/low-frequency region substantially identical to that of the first reconstruction filter g(W1) and a degree of enhancement in the high-frequency region slightly higher than that of the first reconstruction filter g(W1). The third reconstruction filter g(W3) is a reconstruction filter having a degree of enhancement in the mid-/low-frequency region substantially identical to that of the first reconstruction filter g(W1) and a degree of enhancement in the high-frequency region slightly lower than that of the first reconstruction filter g(W1). Thus, the frequency to be enhanced is slightly different among the first-third reconstruction filters g(W1), g(W2), g(W3).

Figure 4:
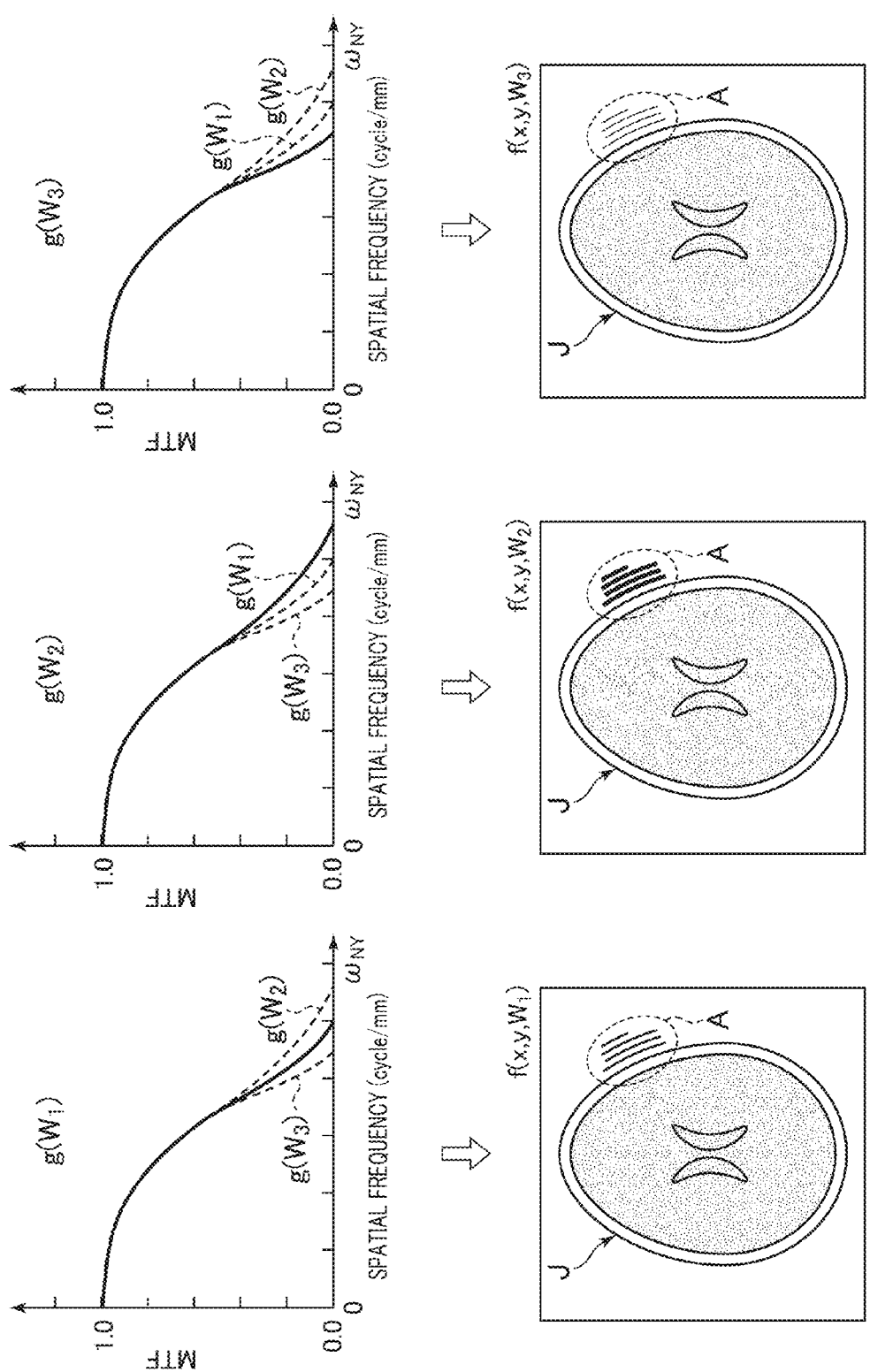
FIG. 4 is a conceptual diagram of comparison among images reconstructed respectively using the first-third reconstruction filters.

FIG. 4 is a conceptual diagram of comparison among images reconstructed respectively using the first-third reconstruction filters. Generally, in a reconstructed image there is a strong tendency to exhibit dominant mid-/low-frequency components in an object J and dominant high-frequency components in aliasing artifacts A. Moreover, the first through third reconstruction filters g(W1)-g(W3) have spatial frequency characteristics such that their degrees of enhancement in the mid-/low-frequency region are substantially identical, and the degree of enhancement in the high-frequency region is somewhat higher in the second reconstruction filter g(W2) and lower in the third reconstruction filter g(W3) with respect to the first reconstruction filter g(W1) in the middle thereof, as described above. Accordingly, in the reconstructed image, the intensity (CT value) of the object J is substantially identical among the images. As for the intensity of the aliasing artifacts A, however, aliasing artifacts A by the second reconstruction filter g(W2) are somewhat stronger and those by the third reconstruction filter g(W3) are somewhat weaker with respect to the aliasing artifacts A by the first reconstruction filter g(W1) in the middle thereof.

Figure 5:
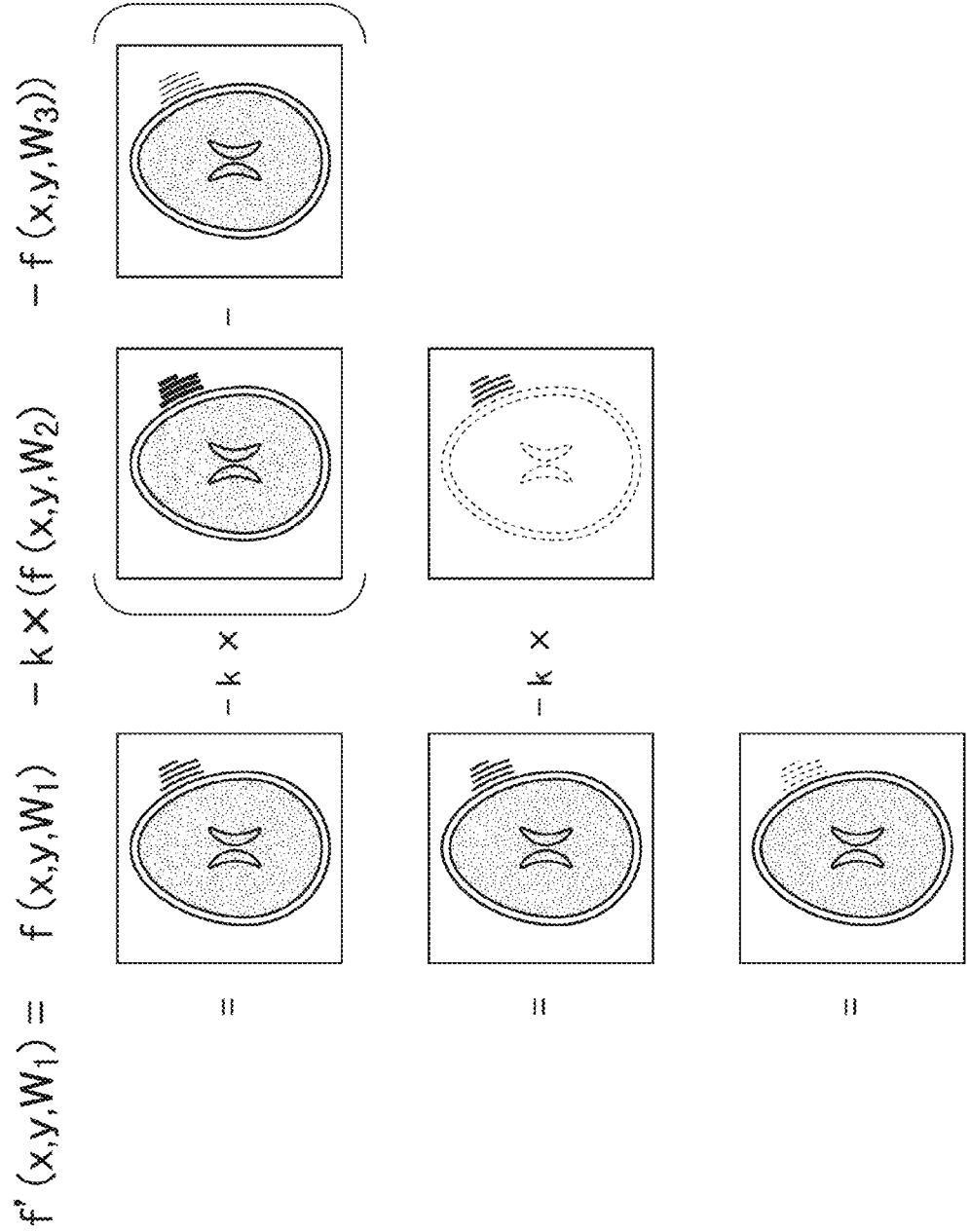
FIG. 5 is a diagram conceptually explaining the meaning of a calculation formula for producing an image having reduced aliasing artifacts.

Therefore, the meaning of the calculation formulae provided above may be explained as follows:

FIG. 5 is a diagram conceptually explaining the meaning of the calculation formula for producing a corrected image having reduced aliasing artifacts. As shown in FIG. 5, the second reconstruction filter g(W2) and third reconstruction filter g(W3) having slightly different degrees of enhancement in the high-frequency region from that of the first reconstruction filter g(W1) are used in image reconstruction, whereby two images having different intensities of the aliasing artifacts can be obtained. By determining a differential image between the two resulting images, aliasing artifact components are extracted. Then, by subtracting the aliasing artifact components multiplied by an appropriate correction factor k to adjust the magnitude from the image reconstructed using the first reconstruction filter, a corrected image having reduced aliasing artifacts can be obtained.

It should be noted that since the intensity of aliasing artifact components depends upon the first-third reconstruction filters g(W1), g(W2), g(W3), an optimal value of the correction factor k is applied according to these reconstruction filters.

Moreover, the second and third reconstruction filters g(W2), g(W3) may both have higher degrees or lower degrees of enhancement in the high-frequency region than the first reconstruction filter g(W1) has.

However, in a setting according to an embodiment, one of the second and third reconstruction filters g(W2), g(W3) may have a higher degree of enhancement in the high-frequency region than that of the first reconstruction filter g(W1), and the other may have a lower degree of enhancement in the high-frequency region than that of the first reconstruction filter g(W1). Thus, differences of the second and third reconstruction filters g(W2), g(W3) from the first reconstruction filter g(W1) can be decreased while keeping a larger difference between the second reconstruction filter g(W2) and third reconstruction filter g(W3). As a result, the aliasing artifact components to be extracted may be enhanced to be more robust against noise, and at the same time, errors thereof may be reduced.

In a setting according to an embodiment, a difference in degree of enhancement in the high-frequency region between the first and second reconstruction filters may be approximately identical to that between the first reconstruction filter g(W1) and third reconstruction filter g(W3). Thus, a good balance may be efficiently obtained between provision of a large difference between the second reconstruction filter g(W2) and third reconstruction filter g(W3) and provision of a small difference of the second and third reconstruction filters g(W2), g(W3) from the first reconstruction filter g(W1). As a result, an effect that the aliasing artifact components to be extracted are enhanced to be more robust against noise, and an effect that errors thereof are reduced may be most efficiently achieved.

Now consider a case in which the spatial frequency characteristics of the second and third reconstruction filters g(W2), g(W3) significantly differ from those of the first reconstruction filter g(W1). In this case, detected aliasing artifact components significantly deviate from aliasing artifacts appearing in an image reconstructed using the first reconstruction filter g(W1), which is a target reconstruction filter. In other words, accuracy of detection of aliasing artifacts is degraded. On the other hand, consider a case in which spatial frequency characteristics of the second and third reconstruction filters g(W2), g(W3) are very close to those of the first reconstruction filter g(W1). In this case, detected aliasing artifact components may be reduced and possibly buried under noise. Accordingly, rates of change of the degrees of enhancement in the high-frequency region in the second and third reconstruction filters g(W2), g(W3) relative to the degree of enhancement in the high-frequency region in the first reconstruction filter g(W1), i.e., rates of change of the MTF value in the MTF curves, should be higher than a certain level and lower than another certain level. Empirically, the rate of change is assumed to fall within a range of 0.1%-5%, for example, and in an embodiment within a range of 0.5%-2.5%. Alternatively, ranges of change between the degree of enhancement in the high-frequency region in the first reconstruction filter g(W1) and the degrees of enhancement in the high-frequency region in the second and third reconstruction filters g(W2), g(W3), i.e., ranges of change of the MTF value in the MTF curves, should be greater than a certain level and smaller than another certain level. Empirically, the range of change is assumed to fall within a range of 0.06%-3.0%, for example, and in an embodiment within a range of 0.3%-1.5%, where MTF value=1 is defined as 100%.

Next, a configuration of the image producing section 33 will be described.

Figure 6:
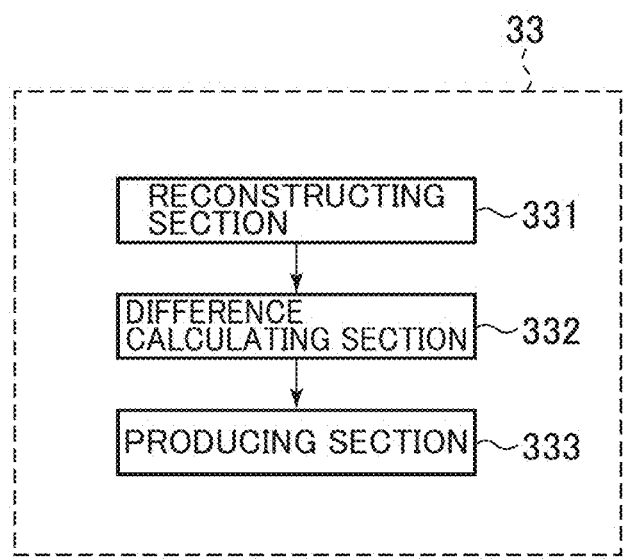
FIG. 6 is a functional block diagram showing a configuration of an image producing section.

FIG. 6 is a functional block diagram showing a configuration of the image producing section 33. The image producing section 33 further has a reconstruction section 331, a difference calculating section 332, and a producing section 333, as shown in FIG. 6.

The reconstructing section 331 reconstructs a first image f(x, y, W1) based on the collected projection data g(X, θ) using the first reconstruction filter g(W1).

The difference calculating section 332 reconstructs second and third images f(x, y, W2), f(x, y, W3) based on the collected projection data g(X, θ) respectively using the second and third reconstruction filters g(W2), g(W3), and calculates a difference between the second image f(x, y, W2) and third image f(x, y, W3).

The producing section 333 produces an image f(x, y, W1) having reduced aliasing artifacts in the first image f(x, y, W1) by subtracting an image component generated by multiplying a difference between the second image f(x, y, W2) and third image f(x, y, W3) by a specified factor from the first image f(x, y, W1).

Next, flow of processing executed in the X-ray CT apparatus will be described.

Figure 7:
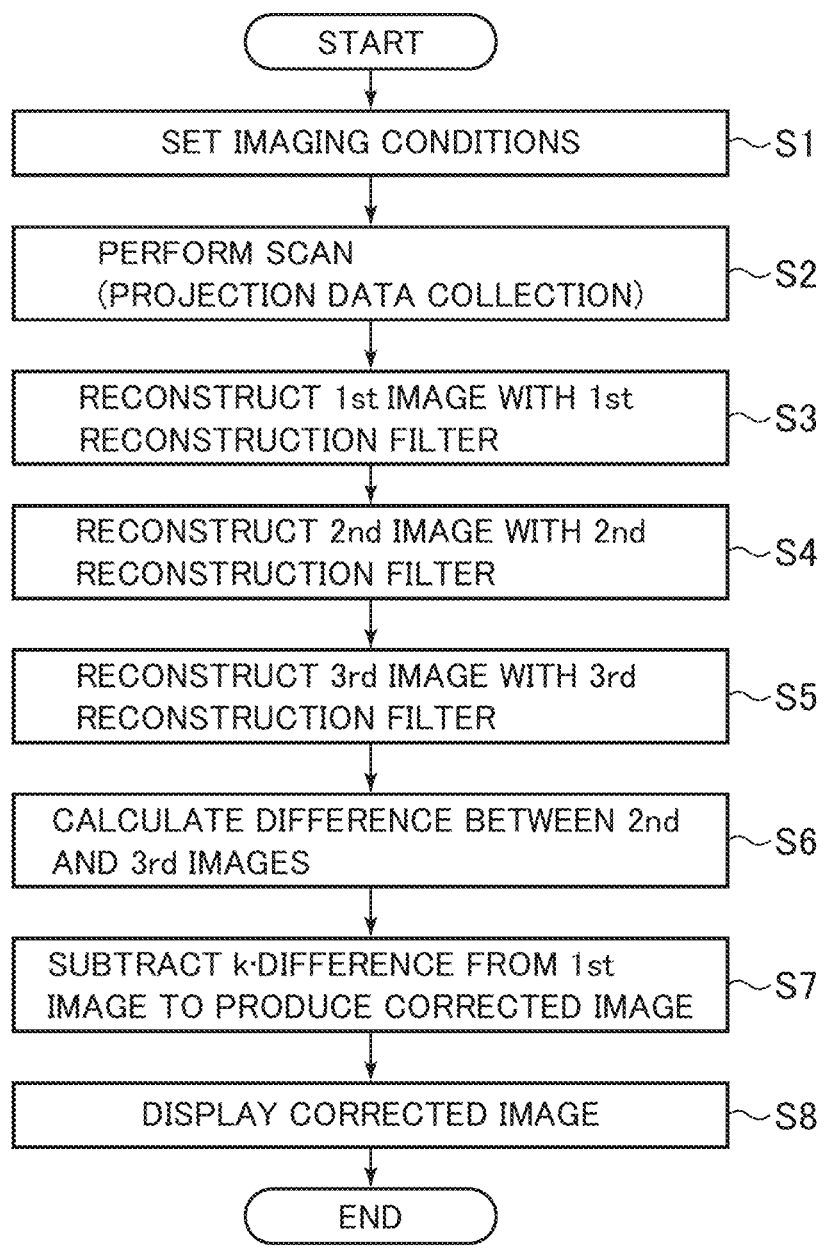
FIG. 7 is a flow chart showing flow of processing in the image producing section.

FIG. 7 is a flow chart showing the flow of processing.

At Step S1, the imaging condition setting section 31 sets imaging conditions including the kind of reconstruction filter for use in image reconstruction based on an operation by the operator 41. Assume here that the set reconstruction filter is the first reconstruction filter g(W1).

At Step S2, the projection data collecting section 32 controls several sections based on the imaging conditions to perform a scan on the subject 40, and collect projection data g(X, θ) in a plurality of views.

At Step S3, the reconstructing section 331 reconstructs a first image f(x, y, W1) based on the collected projection data g(X, θ) using the first reconstruction filter g(W1). The reconstructing section 33 performs image reconstruction processing according, for example, to the following equations:

$$f(x, y, W_1) = \frac{1}{4\pi} \int_0^{2\pi} q(x\cos\theta + y\sin\theta, \theta, W_1) d\theta \qquad (5)$$
$$= \frac{1}{4\pi} \int_0^{2\pi} q(X, \theta, W_1) d\theta$$

$$q(X, \theta, W_1) = \frac{1}{2\pi} \int \int_{-\infty}^{\infty} g(X, \theta) e^{-i\omega X} dX g(W_1) e^{i\omega X} d\omega \qquad (6)$$

At Step S4, the reconstructing section 331 reconstructs a second image f(x, y, W2) based on the collected projection data g(X, θ) using the second reconstruction filter g(W2). The second reconstruction filter g(W2) is a filter in which the degree of enhancement in the high-frequency region is slightly higher than that of the first reconstruction filter g(W1). The reconstructing section 331 performs image reconstruction processing according, for example, to the following equations:

$$f(x, y, W_2) = \frac{1}{4\pi} \int_0^{2\pi} q(x\cos\theta + y\sin\theta, \theta, W_2) d\theta \qquad (7)$$
$$= \frac{1}{4\pi} \int_0^{2\pi} q(X, \theta, W_2) d\theta$$

$$q(X, \theta, W_2) = \frac{1}{2\pi} \int \int_{-\infty}^{\infty} g(X, \theta) e^{-i\omega X} dX g(W_2) e^{i\omega X} d\omega \qquad (8)$$

At Step S5, the reconstructing section 331 reconstructs a third image f(x, y, W3) based on the collected projection data g(X, θ) using the third reconstruction filter g(W3). The third reconstruction filter g(W3) is a filter in which the degree of enhancement in the high-frequency region is slightly lower than that of the first reconstruction filter g(W1). The reconstructing section 331 performs image reconstruction processing according, for example, to the following equations:

$$f(x, y, W_3) = \frac{1}{4\pi} \int_0^{2\pi} q(x\cos\theta + y\sin\theta, \theta, W_3) d\theta \quad (9)$$

$$= \frac{1}{4\pi} \int_0^{2\pi} q(X, \theta, W_3) d\theta$$

$$q(X, \theta, W_3) = \frac{1}{2\pi} \int \int_{-\infty}^{\infty} g(X, \theta) e^{-i\omega X} dX g(W_3) e^{i\omega X} d\omega \quad (10)$$

It should be noted that the order of reconstruction of the first-third images is insignificant.

At Step S6, the difference calculating section 332 determines a differential image between the second image f(x, y, W2) and third image f(x, y, W3). The differential image contains aliasing artifact components appearing in the first image f(x, y, W1).

At Step S7, the producing section 333 produces a corrected image f'(x, y, W1) having reduced aliasing artifacts in the first image f(x, y, W1) by subtracting an image component generated by multiplying the differential image (f(x, y, W2)−(f(x, y, W3)) by a specified correction factor k from the first image f(x, y, W1). The producing section 333 produces a corrected image according, for example, to the following equation:

$$f'(x,y,W_1) = f(x,y,W_1) - k \times (f(x,y,W_2) - (x,y,W_3)) \quad (4)$$

At Step S8, the display control section 37 controls the monitor 6 to display the produced corrected image f'(x, y, W1) on its screen.

FIG. 8 shows a result of comparison between the corrected image produced using the technique proposed herein and an ordinary image produced using a common technique. These images are axial cross-sectional images of a head phantom. The image on the left is an "ordinary image" f(x, y, W) reconstructed using a standard reconstruction filter g(W). The image on the right is a "corrected image" f'(x, y, W) produced using the technique proposed herein using a standard reconstruction filter g(W) as target reconstruction filter. Moreover, the image below is a differential image Δf(x, y, W) between the "ordinary image" f(x, y, W) and "corrected image" f'(x, y, W). As can be seen from the differential image, information on aliasing having a periodically corrugating pattern is mainly extracted rather than a structural difference of the subject 40. By using information mainly containing the information on such aliasing artifacts, the aliasing artifacts can be efficiently and accurately reduced.

FIG. 9 shows partial enlargements of the "ordinary image" f(x, y, W) by the common technique and the "corrected image" f'(x, y, W) of the technique proposed herein shown in FIG. 8, and a profile (spatial variation of the CT value) in the aliasing portion. The image on the left is an enlargement of part of the "ordinary image" f(x, y, W), and the image on the right is an enlargement of the same part of the "corrected image" f'(x, y, W). In the graph below, a dashed line represents a profile of the CT value along a straight line L in the "ordinary image" f(x, y, W), and a solid line represents a profile of the CT value along a straight line L' (at the same position as that of the straight line L) in the "corrected image" f'(x, y, W). As obvious from comparison of these profiles, it can be seen that aliasing artifacts are mainly reduced.

It can be seen from these results that nearly only aliasing artifacts are accurately reduced in an image produced using the technique proposed herein.

Second Embodiment

While in the first embodiment, extraction of aliasing artifact components is performed in an image space, it may be performed in a projection data space, i.e., in a convoluted data space. Therefore, the image producing section 33 may produce an image having reduced aliasing artifacts according, for example, to the following calculation formulae:

$$f'(x, y, W_1) = \frac{1}{4\pi} \int_0^{2\pi} q'(x\cos\theta + y\sin\theta, \theta, W_1) d\theta \quad (12)$$

$$= \frac{1}{4\pi} \int_0^{2\pi} q'(X, \theta, W_1) d\theta$$

$$q'(X, \theta, W_1) = q(X, \theta, W_1) - k \times (q(X, \theta, W_2) - q(X, \theta, W_3)) \quad (13)$$

$$q(X, \theta, W_1) = \frac{1}{2\pi} \int \int_{-\infty}^{\infty} g(X, \theta) e^{-i\omega X} dX g(W_1) e^{i\omega X} d\omega \quad (14)$$

$$q(X, \theta, W_2) = \frac{1}{2\pi} \int \int_{-\infty}^{\infty} g(X, \theta) e^{-i\omega X} dX g(W_2) e^{i\omega X} d\omega \quad (15)$$

$$q(X, \theta, W_3) = \frac{1}{2\pi} \int \int_{-\infty}^{\infty} g(X, \theta) e^{-i\omega X} dX g(W_3) e^{i\omega X} d\omega \quad (16)$$

EQ. (14) represents an operation of determining first-filtered projection data q(X, θ, W1) by multiplying one-dimensional Fourier transform on projection data g(X, θ) in a direction of angle θ with respect to X by a first reconstruction filter g(W1), and applying inverse Fourier transform.

Likewise, EQ. (15) represents an operation of determining second-filtered projection data q(X, θ, W2) by the second reconstruction filter g(W2), and EQ. (16) represents an operation of determining third-filtered projection data q(X, θ, W3) by the third reconstruction filter g(W3).

EQ. (13) represents an operation of subtracting a difference between the second-filtered projection data q(X, θ, W2) and third-filtered projection data q(X, θ, W3) multiplied by a specified correction factor k, from the first-filtered projection data q(X, θ, W1) to determine filtered projection data q'(X, θ, W1) having reduced components corresponding to aliasing artifacts. It should be noted that an optimal value of the correction factor k is applied according to these reconstruction filters.

EQ. (12) represents an operation of back-projecting the filtered projection data q'(X, θ, W1) over 360 degrees of angle θ to reconstruct a corrected image f(x, y, W1).

Third Embodiment

In the first and second embodiments, one of the second reconstruction filter g(W2) and third reconstruction filter g(W3) may be replaced by the first reconstruction filter g(W1) itself.

Specifically, referring to the first embodiment, aliasing artifact components may be determined by a difference between an image reconstructed using the first reconstruction filter g(W1) and an image reconstructed using the second reconstruction filter g(W2) or third reconstruction filter g(W3). A calculation formula in this case may be written as follows:

$$f'(x,y,W_1) = f(x,y,W_1) - k \times (f(x,y,W_1) - f(x,y,W_{2\,or\,3})) \quad (17)$$

The calculation formula represents an operation of subtracting an image component generated by multiplying a difference between the image reconstructed using the first reconstruction filter g(W1) and image reconstructed using the second reconstruction filter g(W2) or third reconstruction filter g(W3) by a specified correction factor k, from the image f(x, y, W1) reconstructed using the first reconstruction filter g(W1) to determine an image f'(x, y, W1) having reduced aliasing artifacts.

Moreover, referring to the second embodiment, the aliasing artifact components may be determined by a difference between filtered projection data q(X, θ, W1) determined using the first reconstruction filter g(W1) and filtered projection data q(X, θ, W2or3) determined using the second reconstruction filter g(W2) or third reconstruction filter g(W3). Calculation formulae in this case may be written as follows:

$$f'(x, y, W_1) = \frac{1}{4\pi} \int_0^{2\pi} q'(x\cos\theta + y\sin\theta, \theta, W_1) d\theta \quad (18)$$
$$= \frac{1}{4\pi} \int_0^{2\pi} q'(X, \theta, W_1) d\theta$$

$$q'(X, \theta, W_1) = q(X, \theta, W_1) - k \times (q(X, \theta, W_1) - q(X, \theta, W_{2 \text{ or } 3})) \quad (19)$$

The calculation formulae represent an operation of subtracting a projection data component generated by multiplying a difference between the first-filtered projection data q(X, θ, W1) filtered using the first reconstruction filter g(W1) and the second- or third-filtered projection data q(X, θ, Wf2or3) filtered using the second or third reconstruction filter g(W2or3) by a specified correction factor k, from the first-filtered projection data q(X, θ, W1) filtered using the first reconstruction filter g(W1) to determine filtered projection data q'(X, θ, W1) having reduced aliasing artifact components, and then back-projecting it over 360 degrees of angle θ to thereby reconstruct an image f'(x, y, W1) having reduced aliasing artifacts.

According to the third embodiment, in an attempt to keep a similar difference between the first reconstruction filter g(W1), which is a target reconstruction filter, and one of the second and third reconstruction filter g(W2or3) to that in the first embodiment, a difference between the first reconstruction filter g(W1) and the other reconstruction filter g(W2or3) may increase, leading to somewhat augmented errors in aliasing artifacts. However, since image reconstruction or filtering on projection data may be performed only for the two kinds of reconstruction filter here, complexity of calculation may be reduced.

Fourth Embodiment

Referring to the first and second embodiments, aliasing artifacts may be classified for each frequency region to adjust the correction factor for each frequency region. Specifically, the difference calculating section 332 determines the "difference" described above for each frequency region of aliasing artifacts using the second and third reconstruction filters defined for that frequency region, and the producing section 333 performs the "subtraction" described above for each frequency region of aliasing artifacts using the correction factor defined for that frequency region and the "difference" determined for that frequency region. Thus, the second and third reconstruction filters that are nearly optimal in all frequency regions of aliasing artifacts may be used to extract information on aliasing artifact components, thus allowing aliasing artifacts to be reduced with high accuracy.

In case that the present technique is applied to the first embodiment, for example, a calculation formula may be written as follows:

$$f'(x,y,W_1) = f(x,y,W_1) - \Sigma_m k(m) \times (f(x,y,W_{2,m}) - f(x,y,W_{3,m})) \quad (20)$$

In case that the present technique is applied to the second embodiment, for example, a calculation formula may be written as follows:

$$q'(X,\theta,W_1) = q(X,\theta,W_1) - \Sigma_m k(m) \times (f(X,\theta,W_{2,m}) - f(X,\theta,W_{3,m})) \quad (21)$$

In these equations, m designates a parameter for identifying each frequency region, W2,m and W3,m are parameters for identifying the second and third reconstruction filters, respectively, defined for the frequency region m.

Fifth Embodiment

Referring to the first through fourth embodiments, the producing section 333 may produce a new image f"(x, y, W1) by performing weighted addition on the original image f(x, y, W1) reconstructed using the first reconstruction filter and the corrected image f'(x, y, W1) having reduced aliasing artifacts for each image region using a weight according to a magnitude and/or degree of variability of the pixel values in that image region. Thus, moderate correction may be applied in, for example, a high-contrast region such as a bone part having greater pixel values or a higher degree of variability of pixel values to prevent deterioration of information on an actual image of the subject 40. Alternatively, rather strong correction may be applied in, for example, a low-contrast region such as a soft part having smaller pixel values or a lower degree of variability of pixel values to aggressively reduce artifacts.

For example, which of the original image f(x, y, W1) or corrected image f'(x, y, W1) is to be used may be decided according to the CT value or SD value (standard deviation of the CT value) in an image on a pixel-by-pixel basis to combine the original image f(x, y, W1) and corrected image f'(x, y, W1). A calculation formula in this case may be written as follows:

$$f''(x, y, W_1) = \begin{cases} f(x, y, W_1), & s(f(x, y, W_1)) = 0 \\ f'(x, y, W_1), & s(f(x, y, W_1)) = 1 \end{cases} \quad (22)$$

In this equation, s(f(x, y, W1)) represents a function for deciding which of the original image f(x, y, W1) and corrected image f'(x, y, W1) should be used according to the CT value or SD value. In the present embodiment, in case that s(f(x, y, W1))=0, the original image f(x, y, W1) is applied, and in case that s(f(x, y, W1))=1, the corrected image f'(x, y, W1) is applied.

Moreover, in what proportion the original image f(x, y, W1) and corrected image f'(x, y, W1) should be mixed, for example, may also be decided according to the CT value or SD value (standard deviation of the CT value) in an image on a pixel-by-pixel basis, and the original image f(x, y, W1) and corrected image f'(x, y, W1) may be mixed according to the proportion. A calculation formula in this case may be written as follows:

$$f''(x,y,W_1) = f(x,y,W_1) \times (1 - s(f(x,y,W_1))) + f'(x,y,W_1) \times s(f(x,y,W_1)) \quad (23)$$

In this equation, s(f(x, y, W1)) has a value between zero and one.

The present invention is not limited to the embodiments described above and may be practiced in several variations without departing from the spirit and scope of the invention.

For example, the processing methods, calculation formulae, etc. herein are provided merely as examples, and several combinations thereof may be contemplated in practice.

Moreover, while the embodiments described above refer to an X-ray CT apparatus, for example, an image producing apparatus performing the image production processing described above constitutes an exemplary embodiment of the invention.

Furthermore, a program for causing a computer to function as such an image producing apparatus, and a storage medium in which the program is stored, for example, also constitute exemplary embodiments of the invention.

While the embodiments described above refer to an X-ray CT apparatus, the invention may be applied to a PET-CT or SPECT-CT apparatus in which an X-ray CT apparatus is combined with PET or SPECT, for example.

What is claimed is:

1. An image producing apparatus comprising: a reconstructing processor configured to use a first reconstruction filter to reconstruct an image based on projection data collected by a scan on a subject to be imaged using a radiation source and a detector; a difference-calculating processor that calculate a difference between two images based on said projection data, said two images being reconstructed using second and third reconstruction filters respectively having spatial frequency characteristics such that degrees of enhancement in a mid-/low-frequency region are substantially identical to each other and degrees of enhancement in a high-frequency region are different from each other; and an image production processor that produce an image having reduced aliasing artifacts using said image reconstructed using said first reconstruction filter, and said difference; wherein said image production processor produces said image having reduced aliasing artifacts by subtracting an image component generated by multiplying said difference by a specified factor, from said image reconstructed using said first reconstruction filter.

2. The image producing apparatus as recited in claim 1, wherein rates of change of the degrees of enhancement in a high-frequency region in said second and third reconstruction filters relative to the degree of enhancement in a high-frequency region in said first reconstruction filter fall within 5%.

3. The image producing apparatus as recited in claim 1, wherein the degrees of enhancement in a mid-/low-frequency region in said first, second and third reconstruction filters are substantially identical to one another.

4. The image producing apparatus as recited in claim 1, wherein said high-frequency region includes a frequency region in the vicinity of a Nyquist frequency.

5. The image producing apparatus as recited in claim 1, wherein
the degree of enhancement in a high-frequency region in one of said second and third reconstruction filters is higher than that in said first reconstruction filter, and
the degree of enhancement in a high frequency region in the other of said second and third reconstruction filters is lower than that in said first reconstruction filter.

6. The image producing apparatus as recited in claim 1, wherein:
said difference-calculating unit calculates said difference for each frequency region of aliasing artifacts using second and third reconstruction filters defined for said frequency region, and
said image production unit performs said subtraction for each said frequency region of aliasing artifacts using said factor defined for said frequency region and said difference determined for said frequency region.

7. The image producing apparatus as recited in claim 1, wherein one of said second and third reconstruction filters is substantially identical to said first reconstruction filter.

8. The image producing apparatus as recited in claim 1, wherein said image production unit produces a new image by performing weighted addition on said image having reduced aliasing artifacts and said image reconstructed using said first reconstruction filter for each image region using a weight according to a magnitude and/or degree of variability of pixel values in said image region.

9. An image producing apparatus, comprising: a first reconstruction filter configured to determine filtered projection data based on projection data collected by a scan on a subject to be imaged using a radiation source and a detector; a difference-calculating processor that determine a difference between two sets of filtered projection data based on said collected projection data, said two sets of filtered projection data being generated using second and third reconstruction filters respectively having spatial frequency characteristics such that degrees of enhancement in a mid-/low-frequency region are substantially identical to each other and degrees of enhancement in a high-frequency region are different from each other; and an image production processor that produce an image having reduced aliasing artifact components using said filtered projection data obtained using said first reconstruction filter, and said difference; wherein said image production processor produces said image having reduced aliasing artifacts by applying back-projection processing to projection data obtained by subtracting a projection data component generated by multiplying said difference by a specified factor, from said filtered projection data obtained using said first reconstruction filter.

10. The image producing apparatus as recited in claim 9, wherein rates of change of the degrees of enhancement in a high-frequency region in said second and third reconstruction filters relative to the degree of enhancement in a high-frequency region in said first reconstruction filter fall within 5%.

11. The image producing apparatus as recited in claim 9, wherein the degrees of enhancement in a mid-/low-frequency region in said first, second and third reconstruction filters are substantially identical to one another.

12. The image producing apparatus as recited in claim 9, wherein said high-frequency region includes a frequency region in the vicinity of a Nyquist frequency.

13. The image producing apparatus as recited in claim 9, wherein:
the degree of enhancement in a high-frequency region in one of said second and third reconstruction filters is higher than that in said first reconstruction filter, and
the degree of enhancement in a high frequency region in the other of said second and third reconstruction filters is lower than that in said first reconstruction filter.

14. The image producing apparatus as recited in claim 9, wherein:
- said difference-calculating unit calculates said difference for each frequency region of aliasing artifacts using second and third reconstruction filters defined for said frequency region, and
- said image production unit performs said subtraction for each said frequency region of aliasing artifacts using said factor defined for said frequency region and said difference determined for said frequency region.

15. The image producing apparatus as recited in claim 9, wherein one of said second and third reconstruction filters is substantially identical to said first reconstruction filter.

16. The image producing apparatus as recited in claim 9, wherein said image production unit produces a new image by performing weighted addition on said image having reduced aliasing artifacts and said image reconstructed using said first reconstruction filter for each image region using a weight according to a magnitude and/or degree of variability of pixel values in said image region.

17. A radiation tomography apparatus comprising a radiation source configured to emit radiation; a detector facing the radiation source and configured to generate signals in response to emitted radiation incident on the detector; and an image producing apparatus, comprising: a reconstructing processor that use a first reconstruction filter to reconstruct an image based on projection data collected by a scan on a subject to be imaged using the radiation source and the detector, a difference-calculating processor that calculate a difference between two images based on said projection data, said two images being reconstructed using second and third reconstruction filters respectively having spatial frequency characteristics such that degrees of enhancement in a mid-/low-frequency region are substantially identical to each other and degrees of enhancement in a high-frequency region are different from each other, and an image production processor that produce an image having reduced aliasing artifacts using said image reconstructed using said first reconstruction filter, and said difference; wherein said image production processor produces said image having reduced aliasing artifacts by subtracting an image component generated by multiplying said difference by a specified factor, from said image reconstructed using said first reconstruction filter.

* * * * *